US009400498B2

(12) United States Patent
Bruck et al.

(10) Patent No.: US 9,400,498 B2
(45) Date of Patent: Jul. 26, 2016

(54) TACTICAL ROBOT CONTROLLER

(71) Applicant: Foster-Miller, Inc., Waltham, MA (US)

(72) Inventors: Kurt Bruck, Cumberland, RI (US);
Boian Bentchev, Norwood, MA (US);
Julie Shapiro, Marlborough, MA (US);
Todd Graham, Pittsburgh, MA (US);
Daniel Deguire, Blackstone, MA (US)

(73) Assignee: Foster-MIller, Inc., Waltham, MA (US)

( * ) Notice: Subject to any disclaimer, the term of this patent is extended or adjusted under 35 U.S.C. 154(b) by 118 days.

(21) Appl. No.: 14/661,204

(22) Filed: Mar. 18, 2015

(65) Prior Publication Data
US 2016/0179091 A1    Jun. 23, 2016

Related U.S. Application Data

(63) Continuation of application No. 13/753,029, filed on Jan. 29, 2013, now Pat. No. 9,014,874.

(51) Int. Cl.
*G05D 1/00* (2006.01)
*G08C 17/02* (2006.01)
*G05D 1/02* (2006.01)

(52) U.S. Cl.
CPC ............ *G05D 1/0016* (2013.01); *G05D 1/0033* (2013.01); *G05D 1/0038* (2013.01); *G05D 1/0088* (2013.01); *G05D 1/0246* (2013.01); *G05D 1/0255* (2013.01)

(58) Field of Classification Search
CPC . G05D 1/0038; G05D 1/0088; G05D 1/0033; G05D 1/0255; G05D 1/0246
USPC .......................... 701/2, 23; 318/16; 361/679.4
See application file for complete search history.

(56) References Cited

U.S. PATENT DOCUMENTS 5,394,168 A    2/1995    Smith, III et al.
5,648,897 A *  7/1997    Johnson ............... G05D 1/0038
                                                        700/259
6,484,083 B1  11/2002    Hayward et al.
(Continued)

FOREIGN PATENT DOCUMENTS

WO    WO2009097895 A1    8/2009

OTHER PUBLICATIONS

Written Opinion of the International Searching Authority for International Application No. PCT/US2014/012529, mailed Dec. 11, 2014, (seven (7)) pages).

*Primary Examiner* — Thomas G Black
*Assistant Examiner* — Wae Louie
(74) *Attorney, Agent, or Firm* — Iandiorio Teska & Coleman, LLP

(57) ABSTRACT

An unmanned systems operator control system includes a hand held controller with a set of switches and control enumeration software specially configured to report a superset of virtual switches based on the physical switches. A core unit includes a first unmanned system control application subscribing to a first switch subset of the superset and outputting commands controlling a first unmanned system based on activation of the set of switches. A second unmanned system control application subscribes to a second switch subset of the superset and outputs commands controlling a second unmanned system based on activation of the set of switches. A mode switching subsystem is configured, in a first state, to map the set of switches to the first switch subset and, in a second state, to map the set of switches to the second switch subset.

7 Claims, 4 Drawing Sheets

(56) References Cited

U.S. PATENT DOCUMENTS

| | | | |
|---|---|---|---|
| 6,491,566 B2 | 12/2002 | Peters et al. | |
| 7,173,814 B2* | 2/2007 | Cohen | G06F 1/1616 341/22 |
| 7,193,384 B1 | 3/2007 | Norman et al. | |
| 7,905,761 B2 | 3/2011 | Weiss et al. | |
| 8,082,074 B2 | 12/2011 | Duggan et al. | |
| 8,199,109 B2 | 6/2012 | Robbins et al. | |
| 8,260,479 B2* | 9/2012 | Christenson | G05D 1/0088 324/163 |
| 8,326,469 B2 | 12/2012 | Phillips et al. | |
| 9,014,874 B2* | 4/2015 | Bruck | G05D 1/0016 340/12.5 |
| 9,164,506 B1* | 10/2015 | Zang | G05D 1/0038 |
| 2007/0198144 A1* | 8/2007 | Norris | H04L 67/12 701/23 |
| 2007/0284474 A1* | 12/2007 | Olson | H04W 4/046 244/10 |
| 2008/0027590 A1 | 1/2008 | Phillips et al. | |
| 2008/0086241 A1 | 4/2008 | Phillips et al. | |
| 2008/0320501 A1 | 12/2008 | Li et al. | |
| 2009/0018712 A1* | 1/2009 | Duncan | G09B 19/167 701/2 |
| 2009/0129003 A1* | 5/2009 | Bruck | G08C 17/02 361/679.4 |
| 2009/0265036 A1* | 10/2009 | Jamieson | G05B 19/0426 700/259 |
| 2010/0100256 A1* | 4/2010 | Jurmain | B25J 3/04 701/2 |
| 2010/0106344 A1* | 4/2010 | Edwards | E02F 9/205 701/2 |
| 2011/0106339 A1* | 5/2011 | Phillips | G05D 1/0033 701/2 |
| 2011/0301786 A1 | 12/2011 | Allis et al. | |
| 2013/0145057 A1 | 6/2013 | Rathi et al. | |
| 2014/0214239 A1 | 7/2014 | Bruck et al. | |
| 2016/0035224 A1* | 2/2016 | Yang | G08G 5/003 701/23 |
| 2016/0091894 A1* | 3/2016 | Zhang | G05D 1/0011 701/2 |
| 2016/0152337 * | 6/2016 | Downey | B64C 39/024 701/2 |

\* cited by examiner

TACTICAL ROBOT CONTROLLER

RELATED APPLICATIONS

This application is a continuation of U.S. patent application Ser. No. 13/753,029 filed Jan. 29, 2013 which hereby claims the benefit of and priority thereto under 35 U.S.C. §§119, 120, 363, 365, and 37 C.F.R. §1.55 and §1.78 and which is incorporated herein by this reference.

GOVERNMENT RIGHTS

This invention was made with U.S. Government support under Contract No. #N00178-11-C-1025 awarded by Naval Surface Warfare Center. The Government may have certain rights in aspects of the invention.

FIELD OF THE INVENTION

The subject invention relates to robot controllers.

BACKGROUND OF THE INVENTION

There are a variety of remotely controlled mobile robots available and each typically include their own specific "Operator Control Unit" (OCU) used by an operator to wirelessly drive and steer the robot, operate its arm, maneuver its cameras, and the like. That is, the OCU for the well-known QinetiQ-NA, Inc. "Talon" robot cannot be used as an OCU to control the iRobot Corp. "PackBot" robot and vise-versa. The same is sometimes true with respect to different model robots of even the same company or vendor and also true with respect to unmanned aerial and watercraft vehicles, different remote sensors, weapons, and the like. For example, the OCU of the "Raven" drone cannot be used to control the "Talon" robot.

The result is an incentive for a so-called "common controller". The U.S. Army program is called the "AN/PSW-2 Common Controller".

U.S. Pat. No. 8,119,109 of iRobot Corp., incorporated herein by this reference, discloses a "twin grip design" input device connected to a rugged laptop computer for controlling teleoperative remote controllable vehicles. The software of the computer is stated to be proprietary but also includes "common OCU software". How the signals output by the switches of the device are processed by the computer is not disclosed but different button function modes are possible.

Others are developing tactical control units with scalable war fighter-machine interfaces. Still others are attempting to adapt game type controllers for controlling unmanned aerial and ground vehicles.

Those skilled in the art have also studied controlling multiple robots or payloads. One example is a soldier controlling a flying drone and, at the same time, controlling a ground robot using one controller. The handheld controller could have one switch set for the ground robot and another switch set for the drone but then the handheld controller would be large and complex.

U.S. Pat. No. 5,394,168, incorporated herein by this reference, discloses a game controller with buttons for controlling movement of one object and an optical subsystem for controlling movement of a different object. U.S. Pat. No. 8,199,109 states that the controller has "mode changing software" which is not disclosed. The "109 patent also states the controller can be used to control two or more payloads.

SUMMARY OF THE INVENTION

A problem occurs when a "common" OCU includes proprietary hardware and/or software and the different teleoperatable remotely controlled vehicles each include proprietary hardware and software. Arriving in a true common OCU which is able to remotely control vehicles of different types and from different vendors is challenging.

In one example of this invention, vendors of different remote control vehicles can keep their controlling hardware (e.g., radios and the like) and their controlling software proprietary. The different radios can even transmit at different frequencies, use different protocols, and the like. Source code of proprietary software is not required. The common controller system of one example of the invention can be used to control any remotely controlled vehicle because the common controller system accepts any remote control vehicle's radio pack and proprietary software for controlling the radio pack.

The invention features, in one example, the ability to use a commercially available handheld controller without the need for mode changing software. The radios and radio software applications for different unmanned system are accommodated. When the controller system will be used to control a drone, robot, or the like, its radio and software applications are incorporated.

Featured is an unmanned systems operator control system comprising a set of switches and control enumeration software configured to report a superset of virtual switches. A first unmanned system control application subscribes to a first switch subset of the superset and outputs commands controlling a first unmanned system based on activation of the set of switches. A second unmanned system control application subscribes to a second switch subset of the superset and outputs commands controlling a second unmanned system based on activation of the set of switches. A mode switching subsystem is configured, in a first state, to map the set of switches to the first switch subset and, in a second state, to map the set of switches to the second switch subset.

In one example, the set of switches are associated with a handheld controller and include at least one joystick and a plurality of X buttons and the superset includes at least two joysticks and 2× buttons. The mode switching subsystem is also typically associated with the handheld controller. One handheld controller further includes a first screen for the first unmanned system and a second screen for the second unmanned system. In one version, the first unmanned system control application and the second unmanned system control application are associated with a core module. A first radio is for transmitting control commands to the first unmanned system. A second radio is for transmitting control commands to the second unmanned system.

The system may also include a video server and transmitter for wirelessly transmitting video displayed on the video screen(s).

Also featured is a method of controlling a plurality of unmanned systems with one handheld controller having a set of switches. The set of switches are mapped to a first switch subset of a superset of virtual switches. The method includes subscribing to the first switch subset when controlling a first unmanned system using the set of switches. The set of switches are mapped to a second switch subset of a superset of virtual switches and the second switch subset is subscribed to when controlling the second unmanned system using the set of switches. Preferably, video associated with the first unmanned system is displayed on a first screen and video associated with the second unmanned system is displayed on a second video screen.

Also featured is a tactical robot controller for first and second robots comprising a first unmanned system control application is configured to output commands controlling a first unmanned system via a first radio. At least a second unmanned system control application system is configured to output commands controlling a second unmanned system via a second radio. A handheld controller includes a set of switches for controlling the first and second unmanned systems and also software delivering switch data to the first unmanned system control application and to the second unmanned system control application. A mode selection is switchable between the first and second unmanned systems. In one preferred embodiment, the handheld controller includes software configured to report a superset of virtual switches, the first unmanned system control application subscribes to a first switch subset of the superset, the second unmanned system control application subscribes to a second switch subset of the superset, and the handheld controller software is configured to map the set of handheld controller switches to the first switch subset when the mode selection is switched to the first unmanned system and to map the set of handheld controller switches to the second switch subset when the mode selection is switched to the second unmanned system.

Also featured is a tactical robot control method for first and second robots comprising controlling a first unmanned system by delivering switch data to a first unmanned system control application issuing commands to the first unmanned system via a first radio, controlling a second unmanned system by delivering switch data to a second unmanned system control application issuing commands to the second unmanned system via a second radio, and switching between control of the first unmanned system and the second unmanned system.

The method may further include the step of reporting a superset of virtual switches based on a set of physical switches generating the switch data, subscribing the first unmanned system control application to a first switch subset of the virtual superset, subscribing the second unmanned system control application to a second switch subset of the virtual superset, and switching between control of the first unmanned system and the second unmanned system by mapping the set of physical switches to the first switch subset when controlling the first unmanned system and mapping the set of physical switches to the second switch subset when controlling the second unmanned system.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
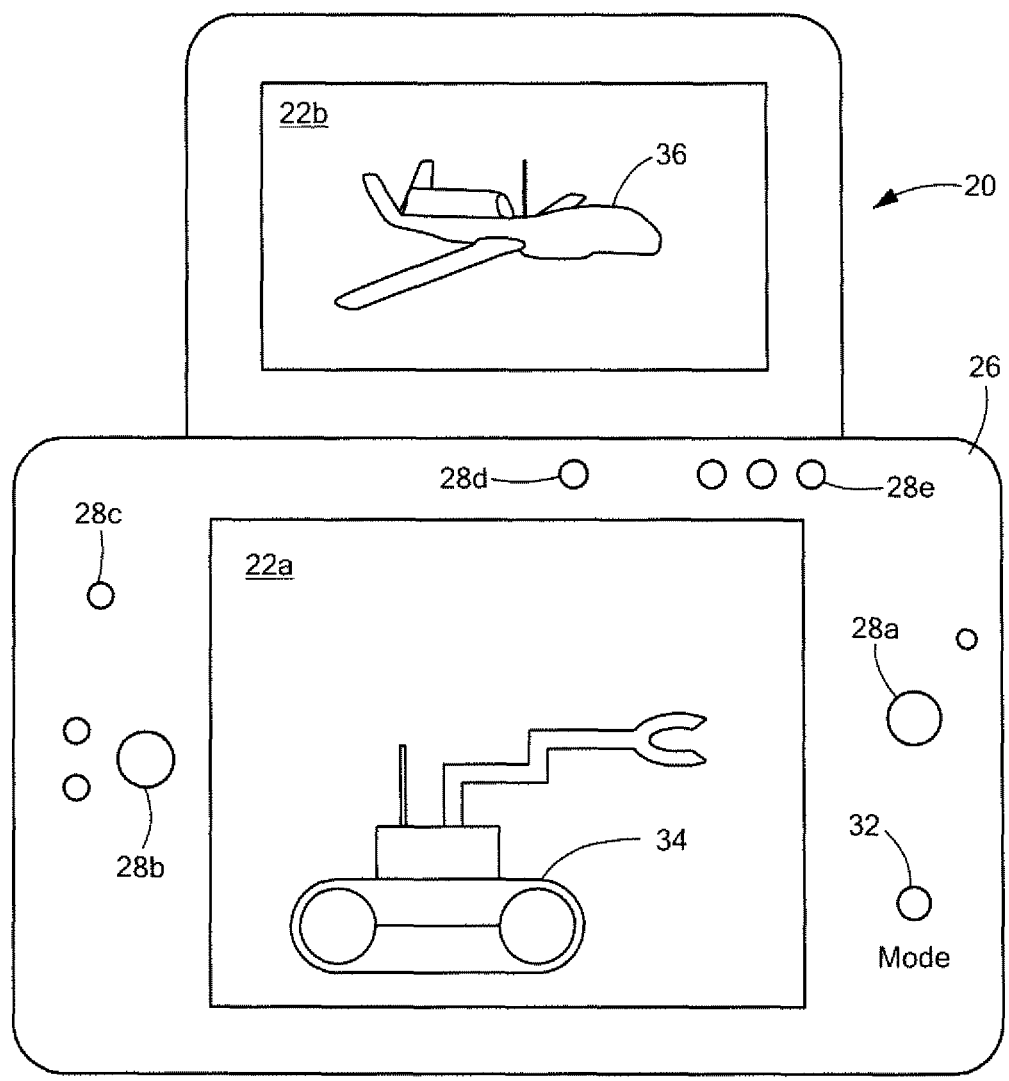
FIG. 1 is a highly schematic view showing an example of a handheld controller in accordance with the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 depicts an example of a handheld controller 20 with first screen 22a, second screen 22b, and housing 26 for a set of switches including, in this particular example, joysticks 28a and 28b and 20 buttons such as button 28c, 28d, 28e and the like. Also featured is mode button 32.

In general, the user can control two or more robots such as ground robot 34 depicted on screen 22a and flying drone 36 as depicted on screen 22b. Video from cameras on the robots is typically delivered to screen 22a and 22b via the robot's radio set. In one example, in a first mode, joystick 28a may be used to control (e.g., turn) ground robot 34 while, in a second mode, joystick 28a is used to control (e.g., turn) drone 36. The different modes are activated by mode button 32. In other examples, there is only one screen and video from the robot cameras is shown in an alternate fashion on the screen in conjunction with the activation of mode button 32 and/or by splitting the screen.

Figure 2:
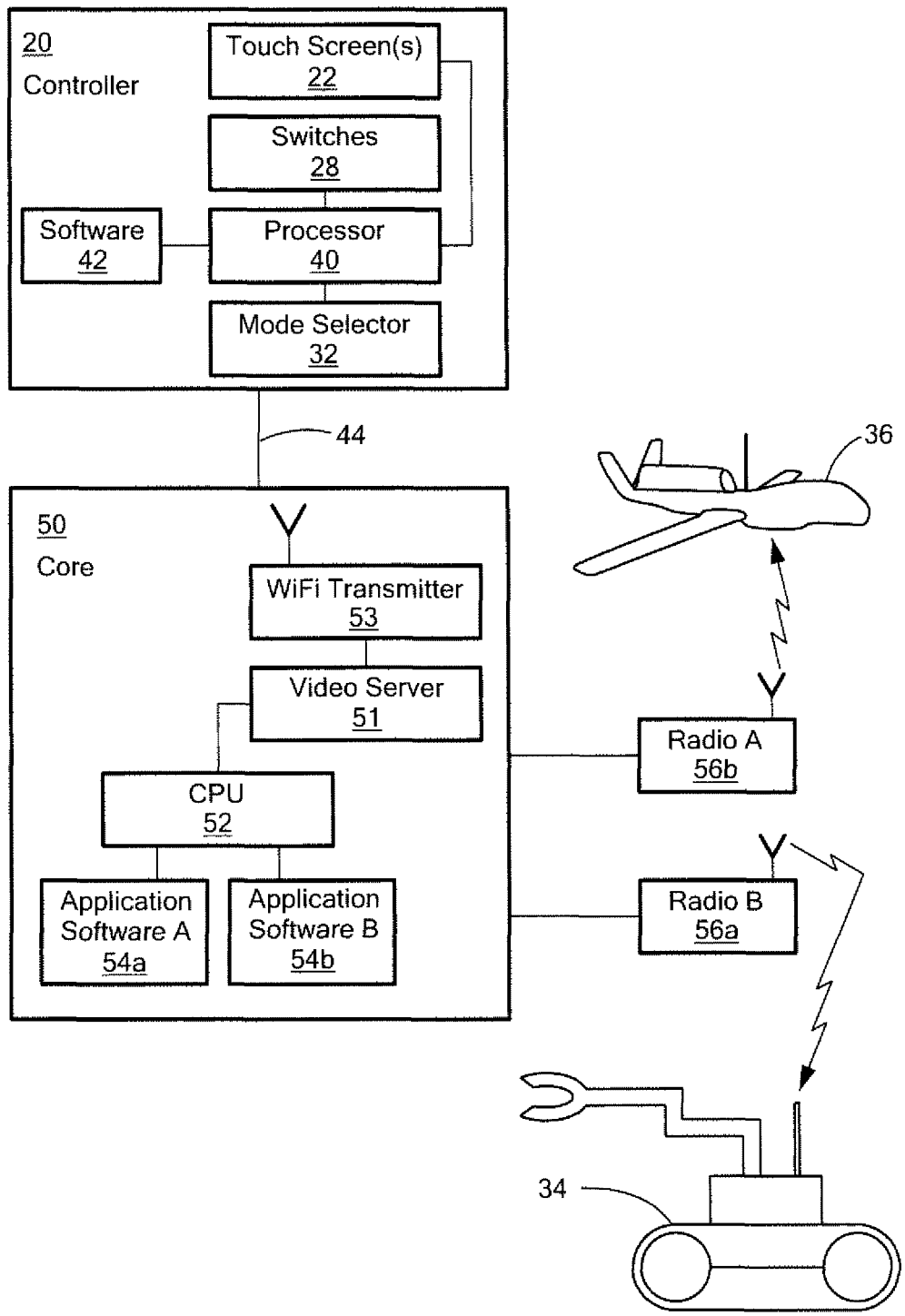
FIG. 2 is a block diagram showing the primary components associated with a tactical robot controller in accordance with one example of the invention.

One preferred architecture for a tactical robot controller is shown in FIG. 2 where controller 20 includes one or more touch screens 22, a set of switches 28, and processor 40 running control enumeration software 42 as well as other software. Processor 40 may be or include one or more microprocessors, application specific integrated circuits, programmable logic devices, controllers and the like. The control enumeration software is configured to deliver switch data to and output a message (via processor 40 and USB cable 44) to core 50 concerning the switch set of handheld controller 20. In this particular example, control enumeration software 42 would normally generate a USB control enumeration message indicating handheld controller 20 has two joysticks and 20 buttons.

But, in order to control multiple robots, control enumeration software 42 is specifically configured to report a superset of virtual switches, e.g., four joysticks and 40 buttons.

Core 50 includes central processing unit 52 (configured for a windows environment, for example) running application software modules such as first unmanned system control application 54a and second unmanned system control application 54b. These applications, in general, generate control signals for their respective robots based on the activation of switches associated with handheld controller 20.

In this invention, application 54a specially subscribes to a first switch subset of the aforementioned superset of virtual switches. Application 54b specially subscribes to a second switch subset of the aforementioned superset of virtual switches. In the example above, application 54a may subscribe to the first and second joysticks and buttons 1-20. Application 54b then subscribes to the third and fourth joysticks and buttons 21-40.

When mode selection switch 32 is activated to control the first robot, software 42 maps the actual physical set of controller switches to the first virtual switch subset, here the first and second joysticks and buttons 1-20. When the mode selection 32 is activated to control the second robot, software 42 maps the actual physical set of switches to the second virtual switch subset, here the third and forth joysticks and buttons 21-40.

In this way, application software 54a which subscribes only to the first virtual switch subset controls the first robot 34 (via signals transmitted by radio 56a) when the mode for the first robot is selected and application software 54a ignores signals from handheld controller 20 when the mode for the second robot is selected since now the handheld controller has mapped its physical switches to the second virtual switch subset which application 54a does not subscribe to. Further, application software 54b which subscribes only to the second virtual switch subset, controls the second robot 36 (via signals transmitted by radio 56b) when the mode for the second robot is selected and application software 54b ignores signals from the handheld controller 20 when the mode for the first robot is selected since now the handheld controller has mapped the physical switches to the first virtual switch subset which application 54b does not subscribe to.

If three robots are to be controlled, the superset of virtual switches could be larger and there may be three switch subsets and three control applications each subscribed to a different subset and transmitting signals to three different radios. Note that the subsets need not, when combined, coincide with the superset, there may be overlap between the subsets, and the superset need not coincide with all the physical buttons.

In one particular example, when the mode for control of robot 34 is selected and joystick 28a, FIG. 1 is toggled to the right, software 42 has mapped joystick 28a to joystick No. 1. Software 42 reports to CPU 52 a switch data message that joystick No. 1 has toggled to the right and application 54a, which subscribes to joystick No. 1, sends a command via radio 56a to turn robot 34 to the right. When the mode for the control of robot 36 is selected and joystick 28a, FIG. 1 is toggled to the right, software 42 has mapped joystick 28a to joystick No. 3. Software 42 reports to CPU 52 a message that joystick No. 3 has toggled to the right and application 54b, which subscribes to joystick No. 3, sends a command via radio 56b to turn drone 36 so it banks to the right.

Note how radios 56a and control software 54a may be provided from the vendor of robot 34 and radio 56b and application software 54b may be provided from the vendor of robot 36. By loading a vendor software and carrying out the subscription and mapping steps described above for the physical switches, a true common controller is realized.

Figure 3:
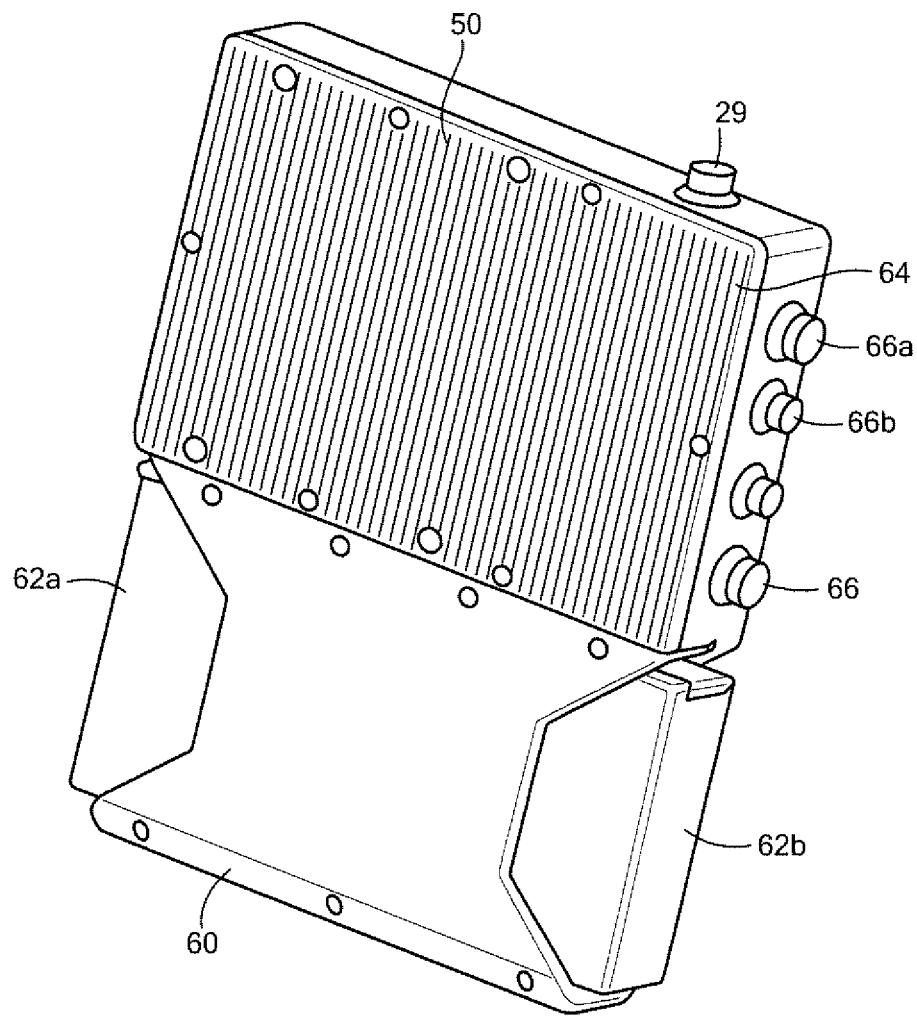
FIG. 3 is a schematic view of the core module shown in block diagram form in FIG. 2.

FIG. 3 shows an example of electronic subsystem core module 50 physically and electrically coupled, in one particular example, to power supply module 60 which includes swappable batteries 62a and 62b. Weighing less than 5.5 lbs, this combination can be placed in a small molle pack or pouch coupled to a soldier's existing molle pack. Core 50 includes heat sink 64, a Wi-Fi/Bluetooth antenna, and various ports or connectors. Handheld controller 20, FIG. 2 is electrically coupled to core module 50, FIG. 3 via USB cable plugged into connector 66. Various radio packs such as radio pack 56a and 56b, FIG. 2 can be electrically coupled to core 50, FIG. 3 via a cable plugged into connectors 66a and 66b. Other ports are for a headset, other radio packs, and/or a personal computer interface (USB, Ethernet, or the like). Power supply module 60 is shown physically as well as electrically coupled to core module 50 but this is not a necessary limitation of the invention. Power supply module 60 can be coupled to core module 50 via a cable, for example.

A solider using handheld controller 20, FIG. 1 may have core module 50 and power supply module 60 located in the bottom half of a molle pouch while the radio packs can be located in the upper half of the molle pouch. The molle pouch can be coupled to an assault pack.

As discussed above, by changing the radio pack and executing different software programs operable on the core module, the solider can use the handheld controller to control different ground robots, different UAVs, remotely controlled watercraft, various pods of an aircraft, sensors, and the like.

The vendors of such devices typically provide their own radio packs plugged into and software programs loaded onto core module. In order to make a software program operate correctly, interface control software modules can be included using a USB button map provided to the various vendors. A vendor can keep its software programs, protocols, and the configuration of a radio pack proprietary.

Core module 50 may also include video server 51 electrically connected to a video out lead of CPU 52 (e.g., a 1-2 GHz dual core processor operating Windows XP OS and employing 4 GB of RAM) for digitizing to an MPEG video stream the analog video signal processed by CPU 52. This MPEG video signal is transmitted by Wi-Fi transmitter 53 so other personnel can view, on a smart phone, for example, the video feed displayed on screens 22a and/or 22b.

Figure 4:
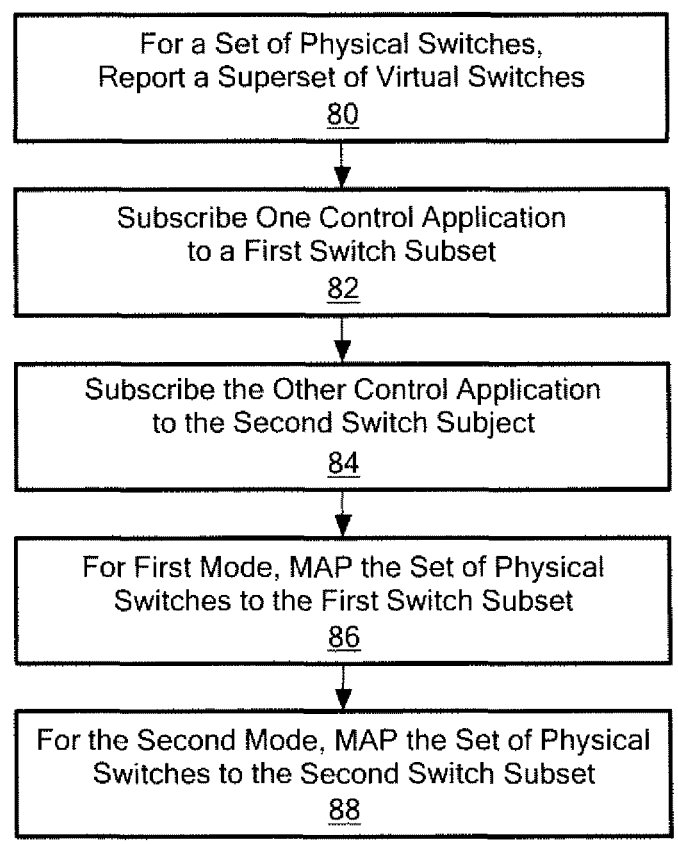
FIG. 4 is a flow chart depicting the primary steps associated with a method in accordance with an example of the invention and the programming of the software disclosed herein.

Note that in some embodiments the software 42, 54a, 54b and the like can be combined, distributed in various modules, and/or reside in firmware. Other software is typically associated with the system. In general, there is software configured, as discussed above, to report to the CPU or other processor(s) a superset of virtual switches, step 80 FIG. 4. One robots control application subscribes to a first switch subset, step 82 and another robots control application subscribes to a second switch subset, step 84. For a first mode, the set of physical switches are mapped to the first switch subset, step 84 and, for the other mode controlling another robot, the set of physical handheld controller switches are mapped to the second switch subset, step 88.

Also note that the functionality of processor 40 and CPU 52 may be combined or reside in circuitry and distributed other than as shown. Microprocessors, controllers, application specific integrated circuits, programmable logic devices and the like may be used. Various signal processing and other electronic and electrical circuitry and printed circuit boards are not shown.

Therefore, although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended.

Other embodiments will occur to those skilled in the art and are within the following claims.

What is claimed is:

1. An unmanned vehicle operator control system comprising:
a power supply module;
a core module coupled to and powered by the power supply module, the core module including:

a first unmanned system control application,
a second unmanned system control application;
a first radio, connected to the core module, for wirelessly transmitting commands issued by the first unmanned system control application for controlling a first unmanned system,
a second radio connected to the core module for transmitting commands issued by the second unmanned system control application for controlling a second unmanned system; and
a handheld controller connected to the core module and including:
a set of physical switches,
a mode switching subsystem configured, in a first state, to map the set of physical switches to a first virtual switch subset subscribed to by the first unmanned system control application and, in a second state, to map the set of physical switches to a second virtual switch subset subscribed to by the second unmanned system control application, and
a processer configured, upon activation of a physical switch, to output a virtual switch data message to the core module for processing by the subscribed unmanned system control application.

2. The system of claim 1 in which the set of switches includes at least one joystick and a plurality of buttons.

3. The system of claim 1 in which the handheld controller further includes a first screen for the first unmanned system and a second screen for the second unmanned system.

4. The system of claim 1 in which the first unmanned system control application is for a first unmanned system which includes proprietary hardware.

5. The system of claim 4 in which the second unmanned system control application is for a second unmanned system which includes different proprietary hardware than the first unmanned system.

6. The system of claim 1 in which the first unmanned control application is for a first unmanned system including proprietary software.

7. The system of claim 6 in which the second unmanned system control application is for a second unmanned system including different proprietary software than the first unmanned system.

* * * * *